Dec. 16, 1941.　　　H. P. KUEHNI　　　2,266,608

PRESSURE MEASURING APPARATUS

Filed Feb. 13, 1940

Inventor:
Hans P. Kuehni
by Harry E. Dunham
His Attorney.

Patented Dec. 16, 1941

2,266,608

UNITED STATES PATENT OFFICE 2,266,608

PRESSURE MEASURING APPARATUS

Hans P. Kuehni, Schenectady, N. Y., assignor to General Electric Company, a corporation of New York Application February 13, 1940, Serial No. 318,683

1 Claim. (Cl. 177—351)

This invention relates to the measurement of pressure and more particularly to improved apparatus for measuring steady-state or transient pressures by electromagnetic means.

It is an object of my invention to provide new and improved apparatus for the measurement of pressures of liquids or gases.

It is another object of my invention to provide a new and improved piston type pressure gage.

It is a further object of my invention to provide an improved pressure responsive device for investigating either steady-state or transient pressures in a chamber whereby hysteresis effects in the measurement results are avoided.

Other objects and advantages of my invention will become apparent as the description proceeds.

In carrying out my invention in its preferred form, I provide a disk of metallic construction in which is integrally formed a pressure sensitive beam. The pressure to be measured is applied to a cylinder in which there is a small piston. The piston transmits the pressure to the beam so that the latter deflects under the applied load. The armature element of an electromagnetic gage is mounted on the beam and is thereby moved in accordance with the beam deflection. I take advantage of the fact that variations in the air gap of a magnetic circuit cause a change in the reluctance of the circuit and by changing this air gap in response to and in proportion to the pressures under measurement I am able to influence suitable instruments to indicate or record the pressures under observation.

Figure 1:
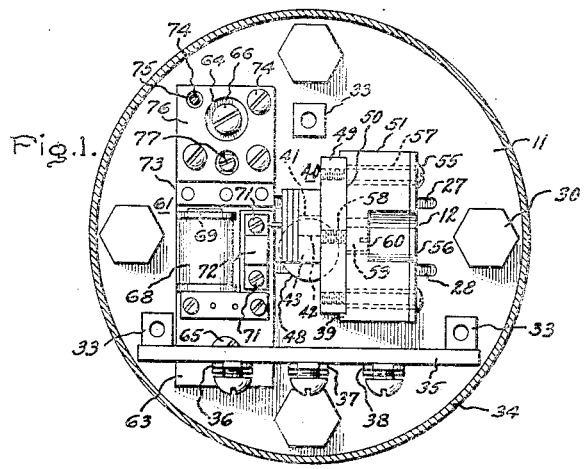
Figure 2:
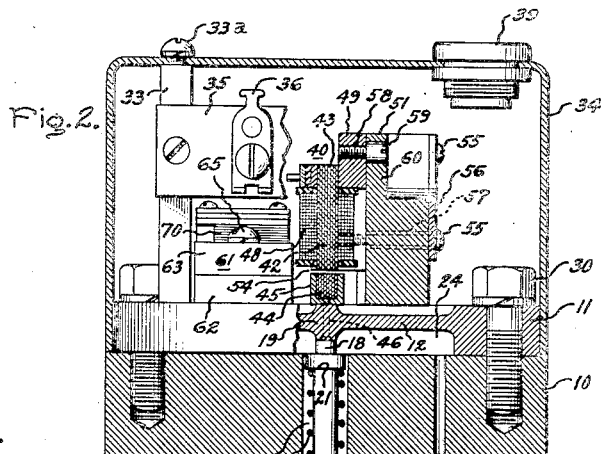
Figure 5:
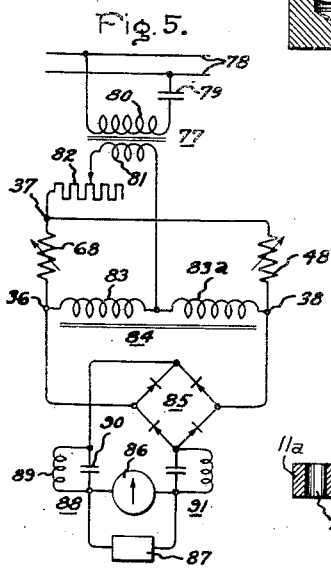
Figure 3:
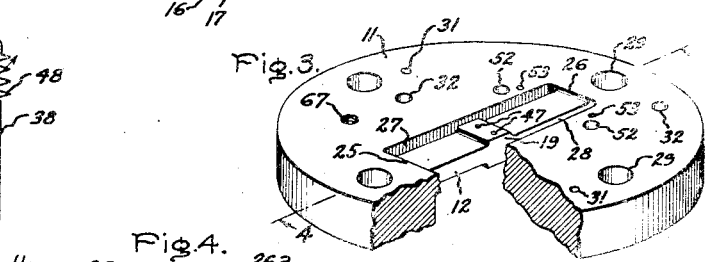
Figure 4:
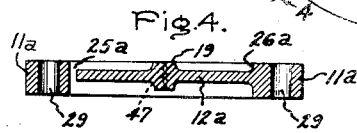

The novel features which I believe to be characteristic of my invention are set forth with particularity in the appended claim. My invention itself, however, both as to its organization and method of operation together with further objects and advantages thereof may best be understood by reference to the following description taken in connection with the accompanying drawing in which Fig. 1 is a plan view of apparatus constructed in accordance with my invention; Fig. 2 is a side elevation view in partial section of the apparatus of Fig. 1; Fig. 3 is a perspective view with a portion cut away of the improved pressure sensitive beam employed in the arrangements of Figs. 1 and 2; Fig. 4 is a sectional view drawn to a reduced scale taken along a line corresponding to 4—4 of Fig. 3 of a modified form of a pressure sensitive beam; and Fig. 5 is a diagram of connections which shows a manner of connecting a portion of the apparatus of Figs. 1 and 2 in an electrical circuit for carrying out my invention.

Referring to Figs. 1 to 3, I have shown an improved piston type pressure gage constructed in accordance with my invention. The numeral 10 designates a body member on which is mounted a steel disk or flat member 11 having integrally formed therein and within the confines of its perimeter a pressure sensitive beam 12. The body member 10 is provided with a threaded portion 13 which is adapted to be secured into the wall of the chamber wherein measurements of pressure are desired. The body member 10 is further provided with a central opening having an upper portion 14 of reduced diameter and a lower portion 15 of larger diameter. Within the threaded portion 13 of the body member 10 which corresponds to the reduced diameter portion 15 is a bushing member 16 in the form of a cylinder and cooperating with this cylinder member 16 is a piston or plunger 17, the upper end 18 of which rests against the central portion 19 of the beam 12. A helical spring 20 which is positioned between a shoulder 21 on the piston 17 and the end 22 of the cylinder holds the head 18 of the piston against the beam 12 at zero pressure on piston 17. When the device is in use the piston 17 is exposed to the pressure under observation and moves in response to the pressure variations and at the same time causes corresponding deflections in the beam 12. A number of interchangeable bushings or cylinders 16 of different internal diameter and cooperating pistons or plungers 17 may be provided so that measurements may be made over several pressure ranges with the same beam and setting of the device. For example, for smaller pressures pistons of correspondingly larger cross-sectional area will be employed. An opening or port 23 is formed in the body member 10 for the purpose of removing a liquid from the chamber 24 which may accumulate therein due to leakage past the cylinder and piston.

The beam 12 which is supported at both ends 25 and 26 is integrally united with the metallic disk member 11 and may conveniently be formed integrally therein intermediate the flat surfaces of the disk by a milling operation. It will be seen that the beam is integrally united at each of its ends 25 and 26 with the disk and freedom of movement relative to the disk is assured by virtue of parallel slots 27 and 28 which are cut through the disk in forming the beam. The beam 12 is preferably made of smaller thickness than the disk 11 to permit of increased flexibility in movement and as shown is of reduced thickness on each side of its central portion 19 and between each of its ends 25 and 26. A plurality of holes 29 formed in the disk provide means through which bolts 30 may be inserted for securing the disk 11 to the body member 10. If desired, a plurality of smaller holes 31 may be provided in the disk 11 to receive dowel pins which engage the body member 10 for preventing any possibility of relative movement between the disk and the body member after they are mounted in position. The disk is also provided with holes 32 which may be countersunk in the opposite face of the disk. These holes are of sufficient size to accommodate means such as screws for holding a plurality of posts 33 in position on the disk. These posts serve to support a cover member 34 and an insulated terminal board 35 on which are mounted terminals 36, 37 and 38. An insulated bushing member 39 provides means for inserting electrical conductors through the cover 34 for connection with these terminals.

I provide an electromagnetic gage for measuring the deflection of the beam produced in accordance with pressure variations. The gage comprises a substantially U-shaped magnetic core 40 comprising legs 41 and 42 joined by a web 43 which cooperate with a laminated magnetic armature 44. The core 40 may be of laminated construction depending upon the frequency of the circuit in which its magnetizing coil is connected. The magnetic armature 44 is conveniently mounted in a housing member 45 which is in turn supported on the central portion 19 of the beam 12 by means of a plurality of pins 46 which pass through openings 47 formed in the central portion of the beam. The U-shaped magnetic core 40, on leg 42 of which is wound a current conducting coil 48, is secured to a body member or base plate 49 which may conveniently be of substantially U-shape and which in turn is positioned in a shallow groove 50 formed in a supporting member 51. The supporting member 51 is adapted to be mounted in position on the disk 11 by means of a plurality of studs (not shown) which pass through openings 52 in the disk 11. The studs preferably pass through the disk 11 from the underneath side thereof and are so arranged that their head portions do not project beyond the bottom surface of the disk. Dowel pins may be positioned in openings 53 formed in the disk to prevent relative movement between the supporting member 51 and the disk after they have been placed in position. In order to provide means for adjusting the air gap 54 of the gage element, the body member 49 is adjustably mounted on the support 51. A plurality of bolts 55 which pass through a clamping plate 56 are each loosely mounted in an opening 57 formed in the support 51 and engage the body member 49. This arrangement allows relative movement between the parts 49 and 51. A screw 58 having an eccentric head 59 which is positioned in an opening formed in the top portion 60 of the support 51 engages the web portion of the body member 49 and provides means for adjusting the gap 54. After the adjustment has been made, the bolts 55 which pass through the clamping plate 56 may be tightened to maintain the parts in position.

I provide a magnetic balancing unit 61 which is similar to the electromagnetic gage already described and the function of which will be later described. The balancing unit 61 comprises a base plate 62 and body portions 63 at each end. The body portions 63 and 64 and the base member 62 are rigidly secured to the disk 11 by bolts 65 and 66 which engage threaded openings 67 formed in the disk 11. It will be observed that the balancing unit is mounted on the disk 11 over the beam 12 at a position intermediate the end 25 and the central portion 19 in such a way as not to interfere with the movement of the beam. The magnetic circuit of the balancing unit is practically identical to that of the gage unit in that it comprises a current conducting coil 68 which is mounted on one leg 69 of a substantially U-shaped magnetic core 70. The magnetic core 70 is rigidly secured to the body member 63 by means of bolts 71. The bolts 71 also pass through a clamping member 72 which serves to hold the leads from the coil 68 (not shown) in position. The magnetic circuit of the balancing unit 61 also includes a magnetic armature member 73 which is adjustably mounted on the body member 64 by means of a plurality of screws 74. These screws pass freely through openings 75 of larger diameter formed in a clamping plate 76 and the armature and thereby clamp the armature in position. A screw 77 similar to the adjusting screw 58 provides means for adjusting the gap between the armature 73 and the other portion of the magnetic circuit. When the armature is adjusted to the desired position, the screws or bolts 74 which pass through a clamping plate 76 may be tightened to hold the parts firmly in position. The cover member or housing 34 which is secured to the posts or studs 33 by the screws 33a engages the perimeter of the disk 11 and serves to prevent the infiltration of dust particles as well as to protect the gage parts from abuse during handling and use. It will be observed that the electrical impedance devices are supported on the rigid disk 11 straddling the beam part therein and are thus secured in close proximity to such beam member and that the disk 11 with the parts so mounted thereon may be removed as a unit and tested and adjusted and calibrated as a unit and replaced without disturbing the adjustment.

The coils 48 and 68 may be electrically connected together and their common connection joined to the terminal 37. The open ends of the coils may be connected one to the terminal 36 and the other to the terminal 38. A cable connecting these terminals may be passed through the insulated bushing 39 of the cover member 34.

In Fig. 4 I have shown a sectional view of a modification taken along a line corresponding to line 4—4 of Fig. 3, of a pressure sensitive elastic member 12a which functions as a cantilever beam, fixed at the end 26a and free at the end 25a. The beam 12a may be formed from a disk 11a in the same manner as the beam 12 already described and may be made of reduced thickness between each of its ends and the central portion 19 at which the force is applied. The advantages present with the employment of the beam 12 are also present here. This type of beam may be employed in certain cases where higher deflection sensitivity is important. The gage apparatus and the balancing unit are secured to the disk 11a and related to the beam 12a in the same manner as described in connection with the foregoing arrangements.

The operation of my device will be better understood by considering it in connection with the other elements of the system in which it is employed. In Fig. 5, there is shown a diagram of electrical connections to which my device is adapted. This diagram of connections may conveniently be employed in carrying out my invention but other types of measuring circuits may be used, if desired.

In the arrangement represented by Fig. 5, a source of regulated voltage is provided, such as a voltage regulating transformer 77 energized by a source of alternating current 78 and consisting essentially of a capacitor 79 and a winding 80 in series, the winding 80 having a saturable core which is operated above the point of saturation. Thus, if variations in the voltage of the source 78 take place, while the current flowing through the winding 80 and the capacitor 79 in series will vary, the absolute magnitude of the alternating flux in the core and the voltage induced in the secondary winding 81 will remain substantially constant. The frequency of the source of supply 78 to be employed will depend upon the frequency of the pressure variations as will be understood by those skilled in the art. For example, when steady or slowly varying pressures are to be measured, the source of supply 78 may be an ordinary commercial lighting circuit. But for pressures which vary rapidly or for transient pressures, a higher frequency supply, such as 2,000 cycles may be found to give more satisfactory results.

The regulated voltage provided by the secondary winding 81 is connected in circuit with a sensitivity control rheostat 82 to energize two differentially connected electrical circuits one of which comprises a section 83 of a differential transformer or reactor 84 and the balancing coil 68, and the other of which comprises a section 83a of the differential transformer and the gage coil 48, the reactance of which is altered in accordance with variations in the pressure applied to the beam 12 or the beam 12a. If desired, adjustable taps may be provided on the secondary winding 81 to provide different voltages. The winding portions 83 and 83a are preferably made electrically similar so that with equal currents flowing in the differential circuits the voltage between the points 36 and 38 will be zero. The balancing coil 68 provides means for adjusting the condition of balance or unbalance of the bridge for any given setting of the air gap 54.

The conjugate portion of the Wheatstone bridge circuit as represented by the points 36—38 is connected to the input terminals of a full-wave rectifier element 85, the output terminals of which may be connected to a direct current responsive instrument 86. If it is desired to record the pressure variations, a recording element, such for example as an oscillograph 87 may be connected to the output of the rectifier 85.

I prefer to employ suitable means in the output circuit of the rectifier 85 for filtering out objectionable fundamental and harmonic disturbances emanating from the supply source to prevent them from affecting the current responsive devices 86 and 87. For example, if the input transformer 77 is energized from a 2000 cycle source of supply, there will be a 4000 cycle frequency ripple in the output in the case where a full-wave rectifier is used. Thus, I may employ a filter 88 having an inductance element 89 and a capacitor 90 and tuned to resonate at the 4000 cycle frequency. As will be understood by those skilled in the art, in operation, the filter 88 presents a practically infinite impedance to the flow of currents having a frequency corresponding to its resonating frequency, so that such currents will have no effect on the measurement results. Also, due to the imperfection of rectifiers such as 85 there may be objectionable 2000 cycle frequencies present and I may in such case employ an additional filter element 91 similar to the element 88 and tuned to resonate at 2000 cycles. Furthermore, it may be that objectionable harmonic frequencies are present in the source of supply. In such an event, I may employ still other means for filtering out these harmonics so that they will not appreciably affect the measurement results.

By means of the variable resistance element 82, sensitivity control may be obtained as desired. In making the measurement the balancing unit and the gage unit are adjusted with their respective eccentric screws, and the pressure gage may be calibrated in any well known manner, such for example, as by connecting the pressure detector to a gage tester or to a reservoir or chamber, the static pressure of which can be measured.

Assuming that it is desired to measure the pressures in a chamber of any sort, the device is screwed into a threaded aperture in the chamber containing the gas or liquid, the pressure of which is to be measured, by means of the threaded end portion 13. The pressure is communicated to the lower end of the plunger or piston 17 thereby moving it and causing a deflection of the beam 12. This causes a change in the air gap 54 of the electric gage which in turn produces a variation in the reactance of the gage coil 48 and unbalances the bridge circuit the output of which is connected to the current responsive devices 86 and 87. With proper calibration, either a direct indication or a graphic record may be obtained in terms of pressure variations. In the case where a conventional continuous circular diaphragm arrangement is employed for measuring pressures, the radial tension produced by the application of pressure to the diaphragm tends to produce minute radial slippage between the parts which are fastened together in such a way that the diaphragm or deflected member will not return consistently to its original position. By means of the present arrangement in which the pressure sensitive beam is milled out from a solid disk or in which the beam is formed as an integral part of a solid metallic disk by integrally uniting at least one end of the beam with the disk, "hysteresis" effects of the beam motion in the region below the elastic limit are prevented so that a return of the beam to its original position after removal of the pressure is assured. These effects are also partially prevented by mounting the magnetic gage elements directly on the disk in which the beam is formed.

The apparatus of my invention may be applied generally to the measurement of pressure and it is particularly suitable for measuring the instantaneous or transient pressures which exist in explosion chambers and the like, such for example, as those produced in the oil chamber of a high capacity oil circuit breaker when the circuit is opened or in the explosion chamber of a gun when fired. It may also be used to advantage for investigating steady-state or transient pressures existing in the cylinders of steam locomotives or internal combustion engines. By the employment of three different sizes of cylinder and piston combinations, I have been able to employ the same beam and setting of the device to cover pressures ranging from zero to 15,000 pounds per square inch gage.

In accordance with the provisions of the patent statutes, I have described the principle of operation of my invention together with the apparatus which I now consider the best embodiment thereof but I desire to have it understood that the apparatus shown is only illustrative and that the invention may be carried out by other means.

What I claim as new and desire to secure by Letters Patent of the United States, is:

In a device responsive to pressure changes a rigid disk member, the interior central portion of said member containing straight parallel slots to form a beam across the central portion of said disk, at least one end of which beam is integrally united with said disk member, said beam having portions of reduced thickness as compared to the thickness of said disk member and being of resilient material so as to flex when pressure is applied thereto in a direction normal to the plane of the disk, pressure responsive means for flexing said beam and electrical means supported on said disk and straddling the beam therein responsive to the flexure movement of said beam.

HANS P. KUEHNI.